Oct. 17, 1944.  A. S. VOLPIN  2,360,599
LINE PRESSURE LUBRICATED PLUG VALVE
Filed April 7, 1941  4 Sheets-Sheet 1
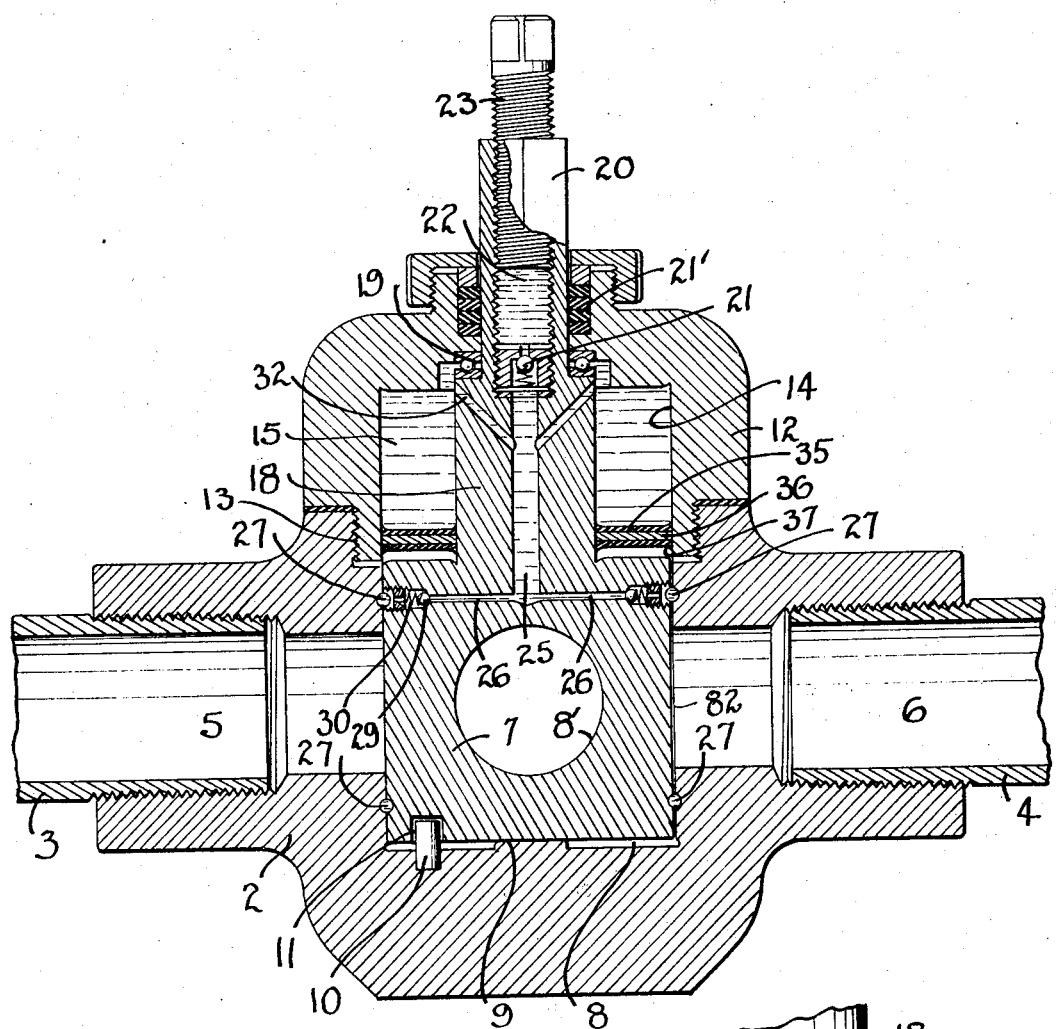
Fig.1
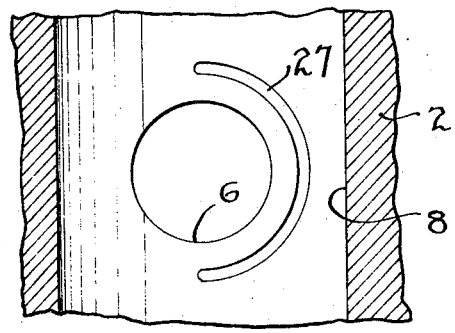
Fig.2
Fig.3
A. S. VOLPIN
INVENTOR.
BY Lester B. Clark
ATTORNEY.

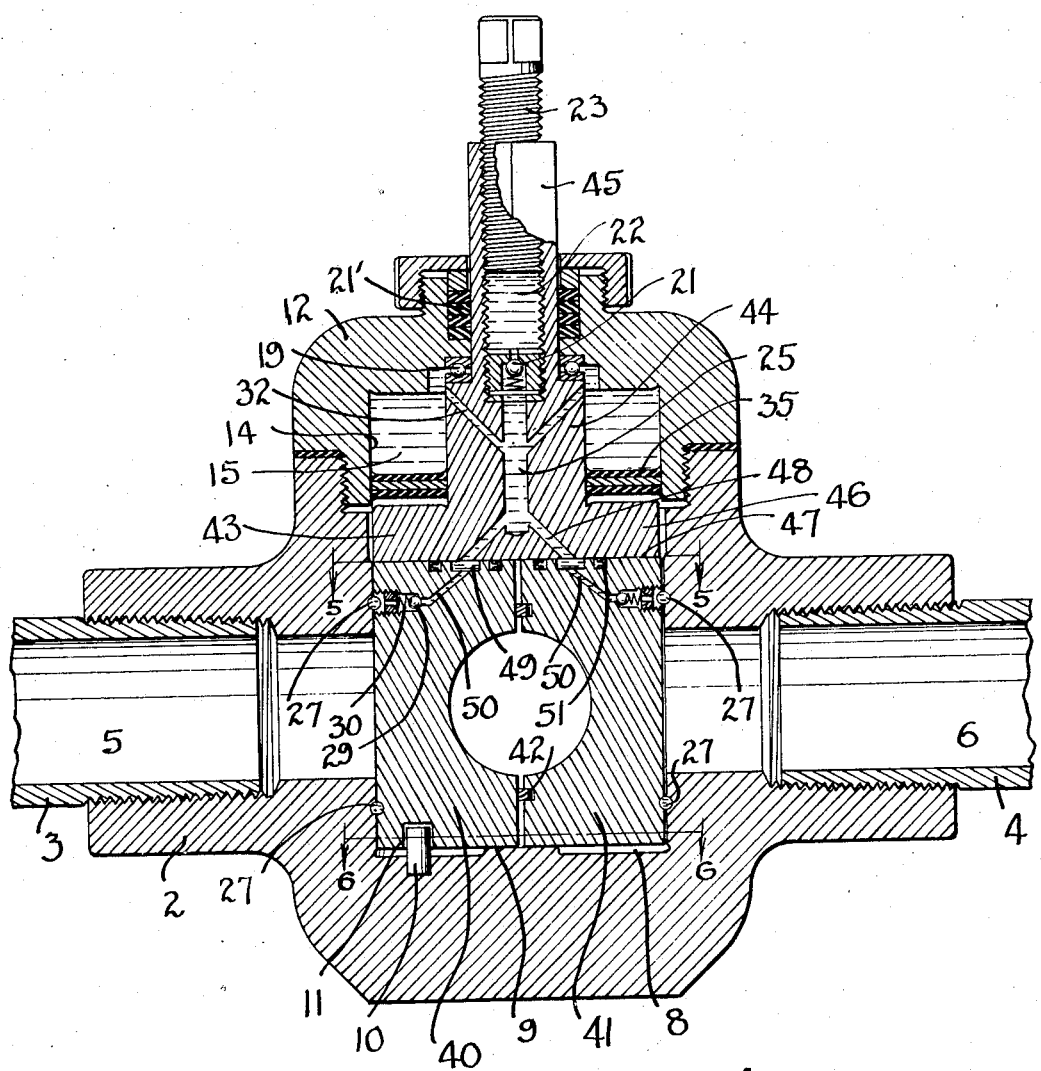
Fig. 4.
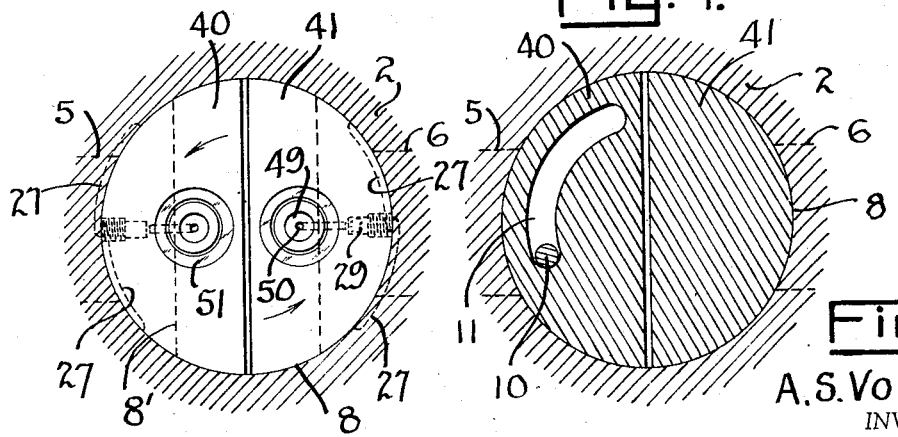
Fig. 5.
Fig. 6.

Oct. 17, 1944. A. S. VOLPIN 2,360,599
LINE PRESSURE LUBRICATED PLUG VALVE
Filed April 7, 1941 4 Sheets-Sheet 3

A. S. VOLPIN
INVENTOR.
Lester B. Clark
BY
ATTORNEY.

Oct. 17, 1944.  A. S. VOLPIN  2,360,599
LINE PRESSURE LUBRICATED PLUG VALVE
Filed April 7, 1941  4 Sheets-Sheet 4

A. S. VOLPIN.
INVENTOR.
Lester B. Clark
BY
ATTORNEY.

Patented Oct. 17, 1944

2,360,599

UNITED STATES PATENT OFFICE 2,360,599

LINE PRESSURE LUBRICATED PLUG VALVE

Alexander S. Volpin, Houston, Tex., assignor to Mission Manufacturing Company, Houston, Tex.

Application April 7, 1941, Serial No. 387,124

9 Claims. (Cl. 251—93)

The invention relates to an improvement in plug valves wherein the line pressure is utilized to automatically feed lubricant to the sealing faces.

In lubricated plug valves one of the problems is to provide a construction wherein a sufficient volume of lubricant or sealing material can be provided so that it need not be replenished as frequently as is necessary where a small supply is utilized.

In some types of plug valves a plurality of reservoirs have been provided which were not interconnected, but with the present improvement it is contemplated that regardless of whether one or more reservoirs are provided that the reservoirs will be so interconnected that the supply of material in either reservoir may be conducted to either side of the plug member.

It is one of the objects of the invention to provide a reservoir in the bonnet of the valve housing so that the material is subjected to line pressure to force it to either or both sides of the plug member.

Another object of the invention is to provide an automatic lubricating system for plug members which are ground eccentrically so that the fit of the plug member against the sealing face will be such as to conserve the amount of sealing material and to retain it in place automatically by the line pressure.

Another object of the invention is to introduce the lubricant material into the top of the reservoir so as to reset the automatic pressure barrier in the reservoir.

Another object of the invention is to provide a dual lubricating system for the split type plug valve.

Another object of the invention is to provide a reservoir in each section of a split type plug for valves with interconnecting passages so that the line pressure may force the lubricant or sealing material from either reservoir to either side of the plug valve.

Another object of the invention is to provide a metal barrier for plug valve lubricant reservoirs which is covered with resilient material to maintain a seal.

Other and further objects of the invention will be readily apparent when the following description is considered in connection with the accompanying drawings wherein:

Fig. 1 is a longitudinal vertical sectional view of the invention wherein the reservoir is in the housing and the sealing material is distributable to either side of the plug.

Figs. 2 and 3 are detailed views of the housing and plug surfaces, respectively, to indicate the distribution grooves.

Fig. 4 is a longitudinal vertical sectional view of a modified form of the device of Fig. 1, except that a split type plug is provided for the part of the distribution system which is embodied in the operating head.

Fig. 5 is a section taken on the line 5—5 and illustrates the manner of transmitting the sealing material from the head to the plug sections.

Fig. 6 is a section taken on the line 6—6 and illustrates the stop member to determine the position of the plug.

Figure 7:
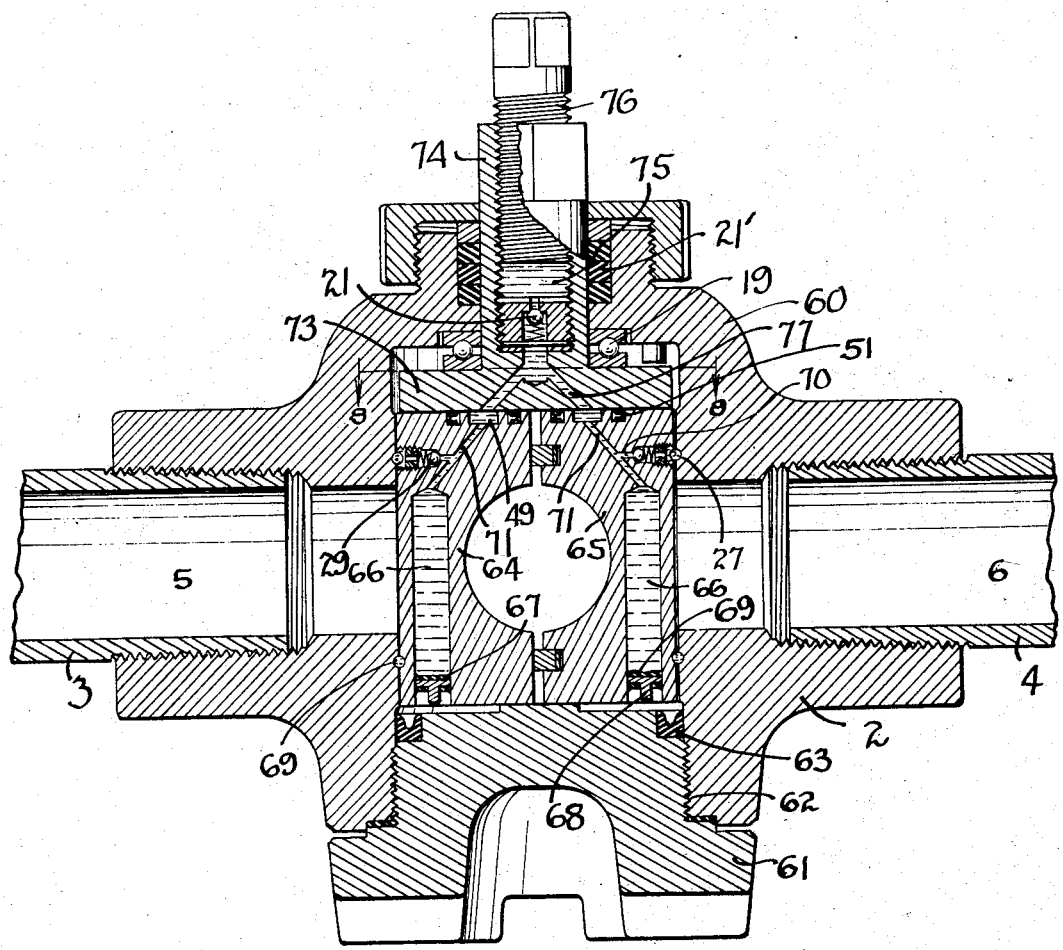
Fig. 7 is a longitudinal vertical section of the mid-section wherein the reservoirs are disposed in the plug section but are interconnected by the distribution system so as to use the capacity of both reservoirs at either side of the plug.

The present application relates to somewhat the same general subject matter as my prior copending application Serial No. 348,491, filed July 30, 1940, now Patent No. 2,332,282, granted October 19, 1943, for a Plug valve, insofar as the arrangement of the reservoir in the housing utilizing line pressure is concerned, and to the same general subject matter as my copending application Serial No. 330,831, filed April 22, 1940, now Patent No. 2,306,839, granted December 29, 1942, insofar as the eccentric construction of the plug member is concerned, and to the same general subject matter as the copending application of Dudley C. Sharp, Serial No. 318,246 filed February 10, 1940 for Lubricated valve which has matured into Patent No. 2,269,887, granted January 13, 1942, insofar as the reservoir construction in the plug utilizing line pressure is concerned.

In Fig. 1 the valve housing is indicated generally at 2 and is positioned in a pipe line between the pipe ends 3 and 4. It is to be understood that high pressure may be applied to the valve end through the passage 5 on one side or the passage 6 on the other side. The plug member 7 is illustrated as a unitary solid plug having the passage 8' therethrough which may be turned into alignment to connect the passages 5 and 6. The plug 7 is disposed in a chamber 8, having the projection 9 upon which the plug is rotatable. A stop pin 10 working in the groove 11 limits the rotative movement of the plug.

The housing 2 and the chamber 8 are closed at the top by a cap or bonnet 12 threaded or otherwise affixed at 13 to the housing. This bonnet has a chamber 14 therein which serves as a continuation of the chamber 8 and is to be used as a reservoir for a body of lubricant or other sealing material 15.

The plug 7 has an enlarged stem 18 thereon which extends upwardly to receive the antifriction bearing 19 to confine the plug against axial movement due to the position of the bonnet 12. The stem is provided with a reduced portion 20 which projects through the stuffing box 21 so that a suitable wrench or other tool may be attached to the top of the stem to turn the plug.

The portion 20 of the stem is hollow to provide a recess 22 into which lubricant may be introduced. A plunger 23 is threaded into the recess to apply pressure to the material therein. A check valve 24 prevents back flow of the material.

The main portion 18 of the stem has a passage 25 therein which connects with the lateral branches 26 leading to the distribution grooves 27 at opposite sides of the plug member 7. A check valve 29 held in position by a spring 30 prevents back flow of the material into the branches 26. The grooves 27 may be semicircular as shown in Figs. 2 and 3, with one portion in the housing 2 and one portion in the plug 7.

In order to provide a suitable supply of lubricant or sealing material in the reservoir 15, openings 32 extend upwardly and outwardly from the passage 25 through the periphery of the stem 18. In this manner material may be discharged from the stem into the reservoir to fill the same. It should be noted that the reservoir extends upwardly in the bonnet 12 so as to allow lubricant to reach the bearings 19.

In order that the high pressure in the pipe line may be available to automatically feed the lubricant into the sealing faces, a movable barrier 35 in the form of an annular ring has been disposed about the stem 18 in the reservoir. This barrier is made up of a rigid body 36 of metal and is provided at each side thereof with a resilient lip type packing 37. The bottom exposed face of this barrier will receive any pressure leaking from the high pressure line past the sealing face on the upstream side.

This pressure accumulating below the barrier will tend to move the barrier upwardly, discharging lubricant through the reservoir through the openings 32, 25 and 26, into the distribution grooves 27. The check valve 29 prevents this higher pressure from flowing into the upstream branch 26 so that the discharge will be on the downstream or low pressure side to prevent the pressure from escaping around the plug through the downstream pipe.

It seems obvious that the sealing material will be automatically distributed in this manner and that a large reserve of material is thus provided. When a new supply of material is to be introduced the plug 23 will be removed, the supply disposed in the chamber 22 or forced through the chamber and the openings 32 to move the barrier 35 downwardly in the main reservoir. If it is desired to flush out the groove 27 sufficient pressure may be applied by the plug 23 even after the reservoir is filled.

Figure 8:
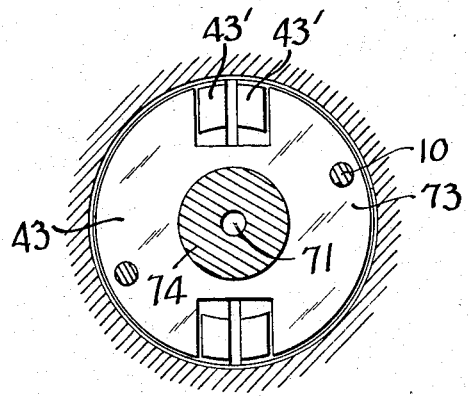
Fig. 8 is a transverse section on the line 8—8 of Fig. 7.

Fig. 4 shows a valve of the same general construction as that of Fig. 1, except that the plug valve 7 is made up of two sections, 40 and 41. These sections are spaced apart at their adjacent faces by a spacer bar 42 which may be urged against the opposing section by a leaf spring. In order to turn the two complementary sections from open or closed position an operating head 43, best seen in Fig. 8, has been shown. This head has cut out portions at opposite edges to receive the lugs 43' on the respective sections so that the sections will be compelled to turn upon turning of the head. This head is provided with a stem portion 44 quite similar to the stem 18 of Fig. 1, and a reduced section 45 similar to the portion 20 in Fig. 1. The base 46 of the head 43, however, is of substantially the same size as the plug members 40 and 41 combined, and abuts against the upper faces 47 of these plugs.

The passage 25 in the stem 44 has the branches 48 leading laterally therefrom into a circular recess 49 in the upper end of each of the sections 40 and 41. This recess has an opening 50 leading therefrom which is similar to the branches 26 in the plug of Fig. 1. The remaining structure in the sections 40 and 41 is the same as that in the plug 7 in Fig. 1.

A suitable packing ring 51 which may be of a lip type facing toward the recess 49 is disposed about each of the recesses so as to prevent the leakage of lubricant or sealing material.

The barrier 35 is the same as that described in connection with Fig. 1.

Fig. 7 shows still another modification of the device wherein the entire assembly has been shortened somewhat and the reservoirs disposed in the plug sections.

The housing 60 is open at its base which is closed by a base plug 61 threaded at 62 into the housing. A lip type packing 63 is thus confined to prevent leakage.

The plug member is made up of the sections 64 and 65 which are similar to the sections 40 and 41, respectively, in Fig. 4, except that the present sections each has a reservoir 66 therein. A barrier 67 in each reservoir is made up of a metal member 68 which is surrounded or enclosed by a resilient portion 69. In this manner a seal is provided. This barrier is exposed to pressure from below which may escape between the plug sections or from the high pressure side. The branch lines 70 lead to the distribution grooves 27 and connect with the feeding passages 71 leading from the reservoir 66. This construction is quite similar to that of Fig. 4.

The head 43 of Fig. 4 has been modified to some extent and includes a base 73 and stem 74. The chamber 75 receives the lubricant to be forced into position by a plug 76, the distribution being through the branch lines 77 into the recess 49, which is similar to that of Fig. 4. The general arrangement, construction and operation of this form is quite similar to that of Fig. 4. It should be noted, however, that the interconnecting passages 71, 49 and 77 permit the flow of material from either reservoir to either side of the plug so that both reservoirs might discharge simultaneously.

Figure 9:
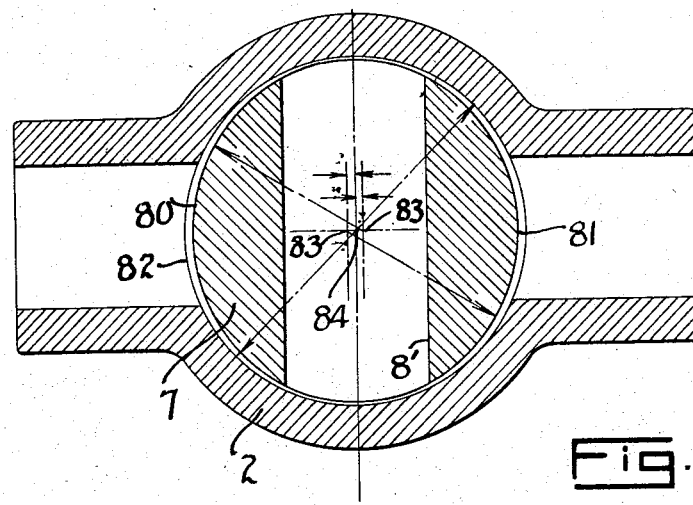
Figs. 9, 10 and 11 are more or less diagrammatical views illustrating the eccentric type of plug wherein the sealing surface is enlarged.
Figure 10:
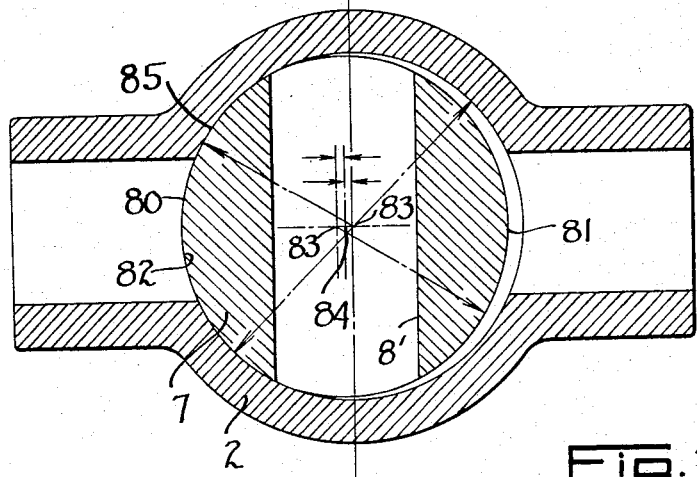
Figure 11:
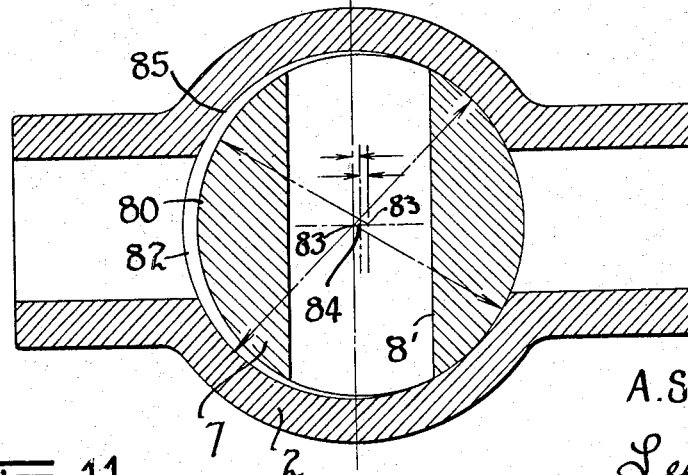

Figs. 9, 10 and 11 are diagrammatic views of the housing 2 and the plug 7 wherein the opposed sealing faces 80 and 81 on the plug have been ground on the arc of a circle which is of exactly the same radius as the opening or plug chamber 82 in the housing 2. In order to provide suitable clearance for the plug, the centers 83 on which these arcs are struck are therefore offset eccentrically of the actual center of the plug. The showings in these figures are distorted to illustrate the construction, the object being to provide two eccentrically seating areas at the points 85 so as to provide a greater sealing area about the port. In Fig. 10 the pressure is being applied from the righthand side, while in Fig. 11 the pressure is applied from the lefthand side. This construction is illustrated in detail in my prior application Serial No. 330,831 previously referred to.

There are certain advantages of this construction in combination with the lubricating features because where there is automatic feeding of the lubricant due to line pressure it is desirable that the amount of lubricant be conserved and the eccentric type of plug lends itself for use with automatic feeding by line pressure due to the fact that there is a greater contact area between the housing and the plug when the plug is constructed with the eccentric arcs on its face.

Broadly, the invention contemplates a lubricated plug valve having a large storage capacity for lubricant and wherein the lubricant is fed by line pressure.

What is claimed is:

1. A lubricated plug valve including a housing, a plug therein, a stem for operating said plug, a lubrication distribution system for the sealing faces of the plug and housing including a reservoir in the housing, a barrier acting as a base on said reservoir and exposed to the line pressure through the valve so as to urge lubricant from the reservoir, distribution grooves in said stem to receive the lubricant from the reservoir, additional distribution grooves in said plug, and a combination inlet and outlet in said stem for the reservoir connected to the top thereof so that said barrier is depressed when lubricant is introduced and thereafter raised by line pressure to automatically discharge the lubricant into said distribution grooves.

2. A lubricated plug valve including a housing, a plug therein, a stem for operating said plug a lubrication distribution system for the sealing faces of the plug and housing including a reservoir in the housing, a barrier acting as a base on said reservoir and exposed to the line pressure through the valve so as to urge lubricant from the reservoir, distribution grooves in said stem to receive the lubricant from the reservoir, additional distribution grooves in said plug, and a combination inlet and outlet in said stem for the reservoir connected to the top thereof and independent of said distribution grooves so that said barrier is depressed when lubricant is introduced and thereafter raised by line pressure to automatically discharge the lubricant into said distribution grooves, and a plurality of check valves to confine the lubricant and prevent back flow from the distribution grooves when filling.

3. A lubricated plug valve including a housing, a plug therein, a lubrication distribution system for the sealing faces of the plug and housing including a reservoir in the housing, a barrier acting as a base on said reservoir and exposed to the line pressure through the valve so as to urge lubricant from the reservoir, distribution grooves to receive the lubricant, and a combination inlet and outlet for the reservoir connected to the top thereof so that said barrier is depressed when lubricant is introduced and thereafter raised by line pressure to discharge the lubricant, said plug having its sealing faces constructed on an off center arc to increase the contact area with the housing to tend to confine the lubricant in the grooves on the low pressure side.

4. A lubricated plug valve including a housing, a split two part plug therein, a stem and head construction to operate both said parts, a lubrication distribution system for the sealing faces of the parts of the plug and housing, a reservoir in the housing, a barrier acting as a base on said reservoir and exposed to the line pressure through the valve so as to urge lubricant from the reservoir, a set of distribution grooves in said stem and head, and a combination inlet and outlet for the reservoir connected to the top thereof so that said barrier is depressed when lubricant is introduced and thereafter raised by line pressure to discharge the lubricant into said grooves, and additional distribution grooves in each part of said plug and each connecting with a distribution groove in said head.

5. A lubricated plug valve including a housing, a two part plug therein, a lubrication distribution system for the sealing faces of each part of the plug and housing including a reservoir in the housing, a barrier acting as a base on said reservoir and exposed to the line pressure through the valve so as to urge lubricant from the reservoir, distribution grooves in each part of the plug to receive the lubricant, and a combination inlet and outlet for the reservoir connected to the top thereof so that said barrier is depressed when lubricant is introduced and thereafter raised by line pressure to discharge the lubricant, a head to operate said plug parts, and means to conduct the lubricant from the reservoir through said head to said grooves.

6. In a plug valve having a split plug having two parts, an operating head to engage and actuate both of said parts, means to introduce a lubricant to said head, branch passages leading laterally through said head, and distribution passages leading through the base of the head so as to discharge lubricant to each of said parts.

7. A split plug type lubricated valve including a housing, a pair of split plug sections therein, means to seal the plug sections and housing faces, an operating head to move said sections, a lubricant reservoir formed between said housing and said head, means to force lubricant into said reservoir, and additional means to discharge lubricant from said reservoir through said head to said first means of each section by the force of the line pressure on the valve.

8. A split plug type lubricated valve including a housing, a split plug therein, means to seal the plug and housing faces, an operating head and stem to move both said parts, a lubricant reservoir, means in the stem to force lubricant into said reservoir, and additional means also in the stem to receive the discharge lubricant from said reservoir and to conduct the lubricant to said first means for each of the parts of the plug by the force of the line pressure on the valve, said reservoir being disposed in said housing.

9. A split plug type lubricated valve including a housing, a plug therein made up of two split sections, means to seal the section and housing faces, an operating head, a lubricant reservoir including a portion in each of said split plug sections, means to force lubricant into said reservoir, and additional means including a connection to discharge lubricant from the portion of said reservoir in each section to said first means by the force of the line pressure on the valve.

ALEXANDER S. VOLPIN.